UNITED STATES PATENT OFFICE.

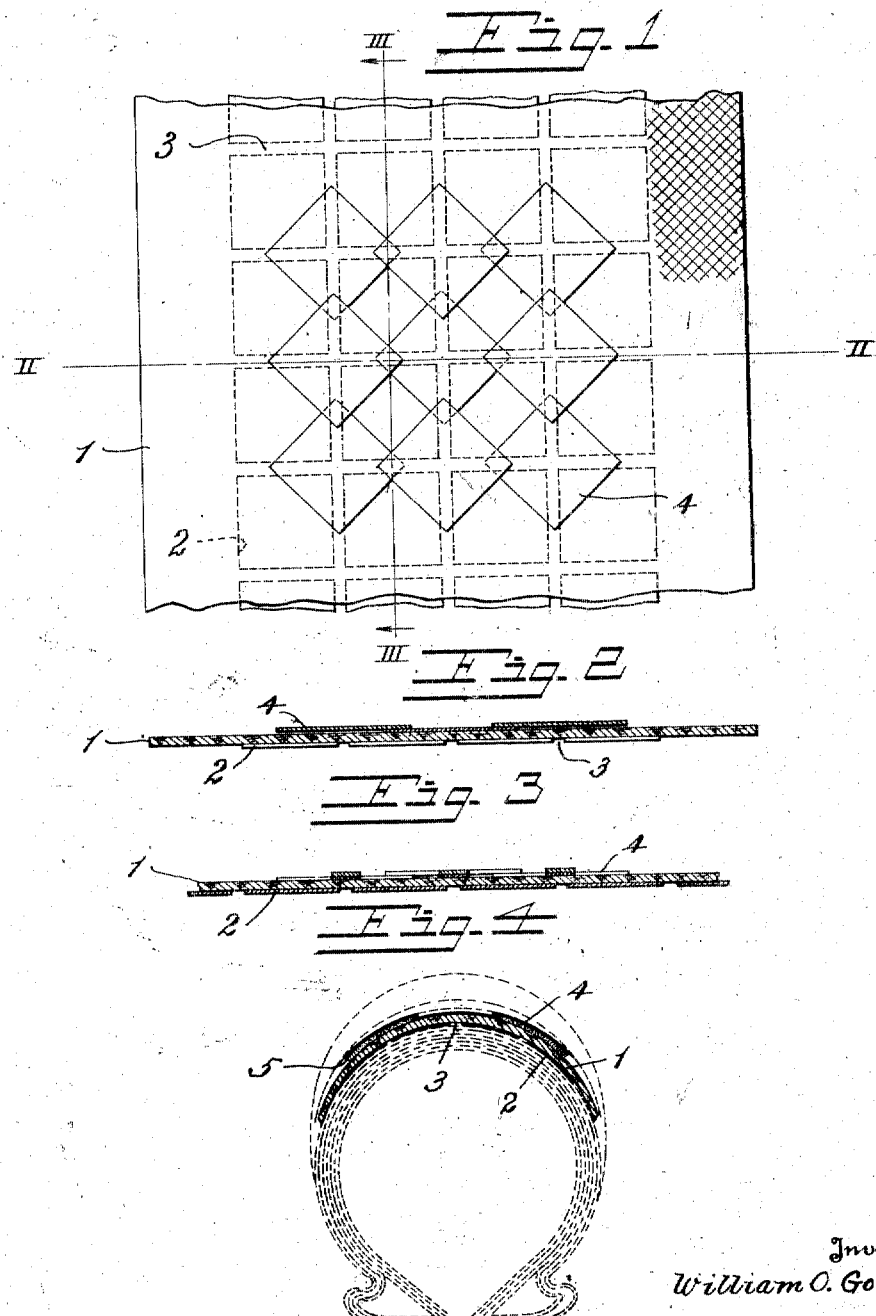

WILLIAM O. GOTTWALS, OF WASHINGTON, DISTRICT OF COLUMBIA.

ARMORED TIRE.

1,281,558.  Specification of Letters Patent.  Patented Oct. 15, 1918.

Application filed October 22, 1917. Serial No. 197,858.

*To all whom it may concern:*

Be it known that I, WILLIAM O. GOTTWALS, a citizen of the United States, residing at Washington, in the District of Columbia, have invented certain new and useful Improvements in Armored Tires, of which the following is a specification.

The invention relates to puncture proof devices for armoring pneumatic tires, the principal objects being to provide a light and quite flexible sheet having metal plates attached to or somewhat embedded in its opposite surfaces, such sheet being adapted to be combined with an interior tube and an exterior carcass in such manner that nails, tacks, stones, etc., if they perforate the carcass will be deflected by said plates through which they find no joint or interstices whereby to enter and puncture the inner air tube. By a special arrangement of the said plates on the opposite sides of the flexible fabric or equivalent sheet, I obtain the above described protection with the minimum amount of metal and minimum number of such plates, the arrangement also being such as to allow the fabric to freely yield and bend in all directions, little or no resistance to such bending being offered by the said plates.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Figure 1 is a plan view of the armored sheet, showing what is preferably the exterior side of the same.

Fig. 2 is a sectional view on the line II—II of Fig. 1.

Fig. 3 is a similar view on line III—III of Fig. 1.

Fig. 4 is a cross sectional view of a tire comprising an inner tube and an exterior carcass, the latter part being shown in dotted lines and the puncture proof device being shown in full lines for better distinction of the several parts.

Referring to the drawings, 1 indicates the flexible sheet to which the armor plates are applied, said sheet being preferably of canvas although not necessarily limited to that particular material.

2 indicates the armor plates which are applied to the inner surface of the flexible sheet 1, the same being cemented to the sheet by rubber cement or attached in an equivalent manner. These plates are shown as substantially square, but they may be otherwise of somewhat different shape not inconsistent with the objects of the invention. The plates 2 are arranged in longitudinal and transverse rows, as best seen in dotted lines in Fig. 1, with their sides respectively parallel with and transverse to the circumferential lines of the tire. It is ordinarily more convenient to apply the plates to the fabric with small spaces intervening between one plate and the next, as indicated at 3 in Fig. 1, and I term the lines along which the plates have their edges slightly spaced apart, the joint lines of said rows of plates.

4 indicates the plates on the opposite, and preferably exterior side of the sheet. These plates 4 may be of substantially the same shape as the plates 2, and they are arranged in longitudinal and transverse rows, but the arrangement is such that the lines of the sides of the plates are diagonal to the circumferential lines of the tire and to the sides of the plates 2. I also prefer to arrange the plates 4 close enough together so that their extremities or corners will lap one upon another, as shown in Figs. 1 and 2, thereby entirely covering every possible joint or interstice with a protecting shield of metal.

The plates 2 and 4 are ordinarily of thin resilient steel, although other suitable metal may be employed.

The plates 4 are firmly cemented and attached to the sheet 1, and the underneath layer of the plates 4 may be more or less pressed into and embedded in the fabric. In Fig. 4 the rubber or other cement by which the plates 4 are attached is indicated at 5.

Changes and variations may be made in the details of the device without departing from the spirit of the invention, and such changes and variations are contemplated as fall within the scope of the claims appended hereto.

What is claimed is:

1. In an armored tire, in combination, an inner tube, an exterior carcass, and a protecting layer consisting of a flexible sheet having substantially rectangular metal plates attached to opposite sides of the same, the plates on one side of said sheet being arranged in rows with their edges respectively parallel with and transverse to the circumferential lines of the tire, and the plates on the other side of said sheet being arranged opposite the joint lines of the first mentioned plates and with their sides diagonal to said circumferential lines and with their corners lapped.

2. A puncture-resisting device adapted to be combined in an armored tire, consisting of a flexible sheet having substantially rectangular metal plates attached to opposite sides of the same, the plates on one side of said sheet being arranged in rows with their edges respectively parallel with and transverse to the circumferential lines of the tire, and the plates on the other side of said sheet being arranged opposite the joint lines of and widely spaced apart at their sides and with their extremities only lapped.

In testimony whereof I affix my signature hereto.

WILLIAM O. GOTTWALS.